United States Patent [19]

Tega et al.

[11] 4,127,987
[45] Dec. 5, 1978

[54] MACHINE FOR MANUFACTURING CHAINS HAVING DIFFERENTIATED LINKS

[75] Inventors: Ezio Tega; Danilo Volpi, both of Arezzo, Italy

[73] Assignee: Metalmeccanica Gori & Zucchi MGZ S.p.A., Arezzo, Italy

[21] Appl. No.: 781,971

[22] Filed: Mar. 28, 1977

[30] Foreign Application Priority Data

Mar. 30, 1976 [IT] Italy ................... 9393 A/76

[51] Int. Cl.² ............................ B21L 11/00
[52] U.S. Cl. ............................ 59/16; 59/25
[58] Field of Search ................ 59/1, 3, 10, 16, 18, 59/19, 23, 24, 25

[56] References Cited

U.S. PATENT DOCUMENTS

| 1,340,639 | 5/1920 | Weinacker | 59/25 |
| 1,637,758 | 8/1927 | Wenz | 59/16 |
| 3,961,474 | 6/1976 | Esser | 59/23 |

Primary Examiner—C.W. Lanham
Assistant Examiner—Gene P. Crosby
Attorney, Agent, or Firm—Hopgood, Calimafde, Kalil, Blaustein & Lieberman

[57] ABSTRACT

The invention contemplates an automatic selectively programmable machine for making chains having links of different size in interlaced and connected assembly. By programming, the size and interlaced combination of different links can be selected to produce a wide variety of chain patterns.

8 Claims, 15 Drawing Figures

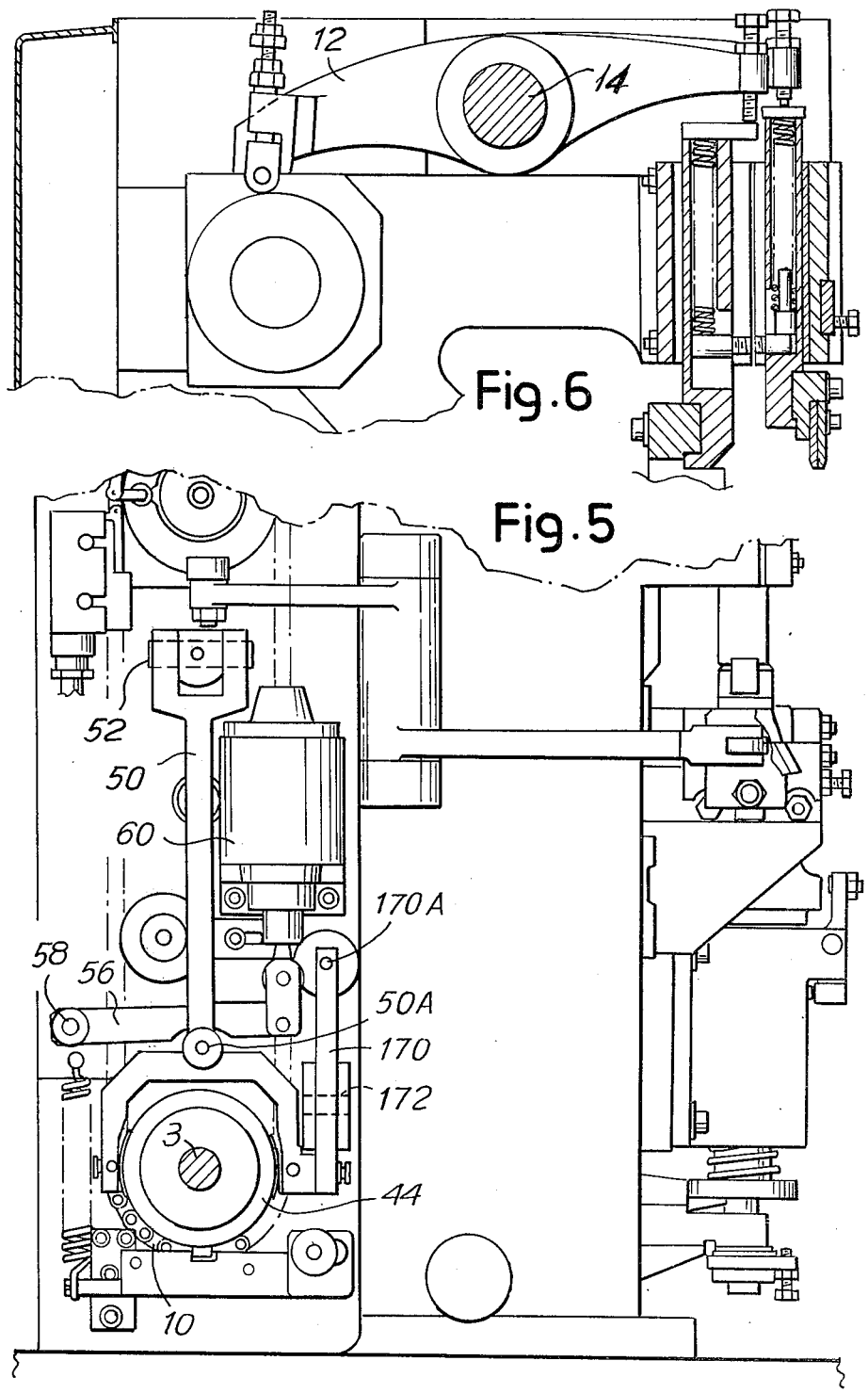

MACHINE FOR MANUFACTURING CHAINS HAVING DIFFERENTIATED LINKS

The invention relates to a machine for manufacturing chains which is designed to produce a selected one of a plurality of combinations of different links on the same chain without any particular difficulty, just by modifying a program definition, or by replacing a given tape program with another. A machine of this type includes plural groups or sections of operative members, said sections being designed to selectively work in alternation, as well as common operative portions operating in a continuous manner.

According to the invention, the machine includes an electric type programme with control-pulse generators, pulse counters and the like, electromechanical transducers with electromagnets solenoids or the like designed to arrange switching in the mechanical controls, and cam means synchronized with the common operative parts to operate switching in the mechanical controls with exact synchronism among the several sections and with said common operative portions More particularly, the machine — which is designed for the manufacture of chains, with a program designed to make possible a plurality of combinations of different links which can be formed by means of two or more feeds of wire-form material for the formation of the links — includes for each feed at least an operative section with an assembly of cams operated by a cam shaft and corresponding operative devices operated by the cams, as well as a continuously rotating drive shaft with cams. In order to embody the invention, the machine further includes: programming means designed to generate electric signals as a function of the defined combination; for each feed, that is for each section, at least a solenoid designed to impart a mechanical movement in an arrangement member; an engaging and disengaging cam means on the drive shaft having continuously rotating cams; a tappet controlled by said arrangement member to be located in a cooperating position with said engaging and disengaging cam, and in an offset position to said cam to obtain a control of said member in a perfect synchronism or timing with the cam drive motor, and engagement and disengagement means controlled by said tappet to operate the respective section according to the program defined by the received electric signals.

The invention will be better understood from the following specification and the accompanying drawings, which illustrates an embodiment but is not intended to restrict the invention. In the drawing:

FIGS. 5 and 6 illustrate two local sections, respectively taken along line V—V of FIG. 1 and line VI—VI of FIG. 2;

Figure 10:
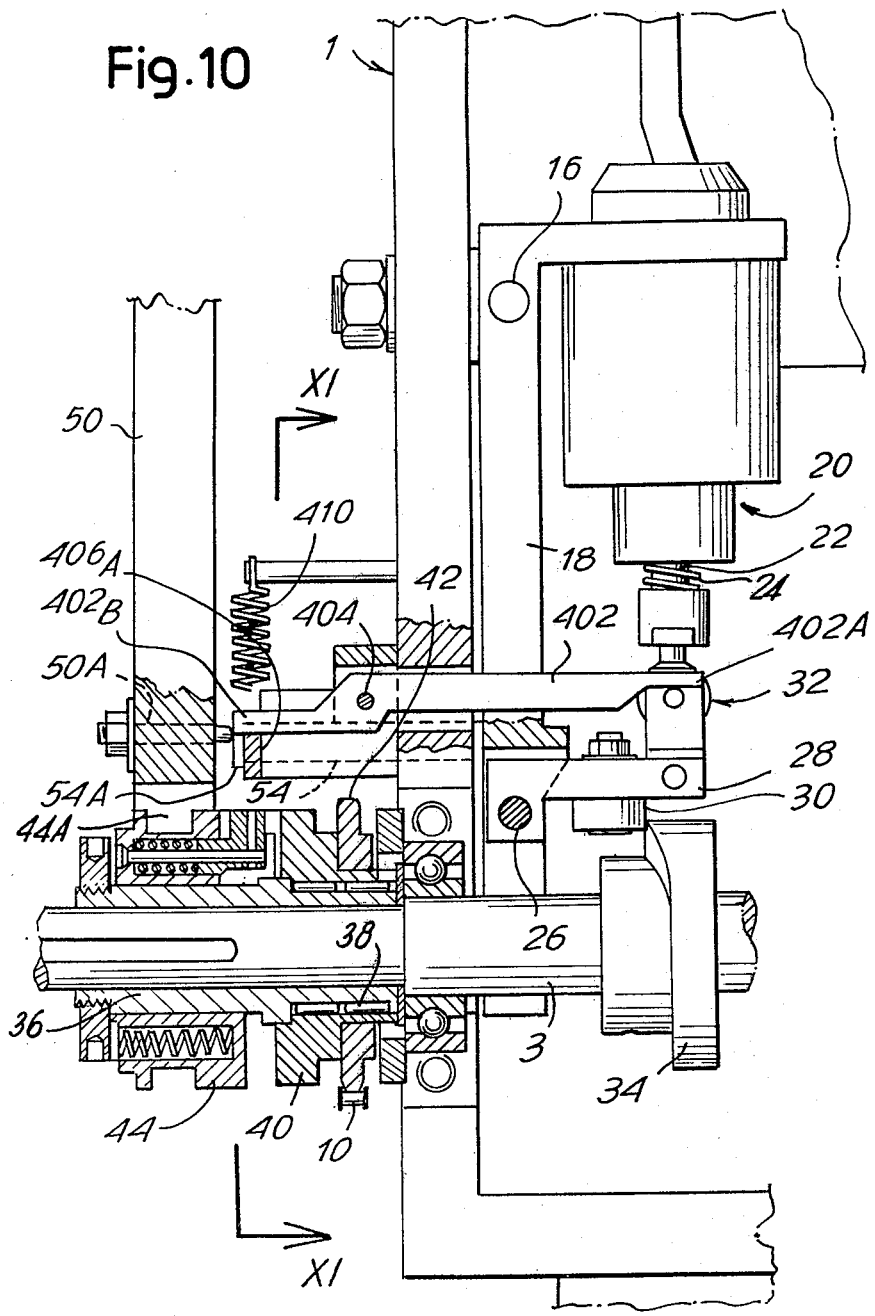
Figure 11:
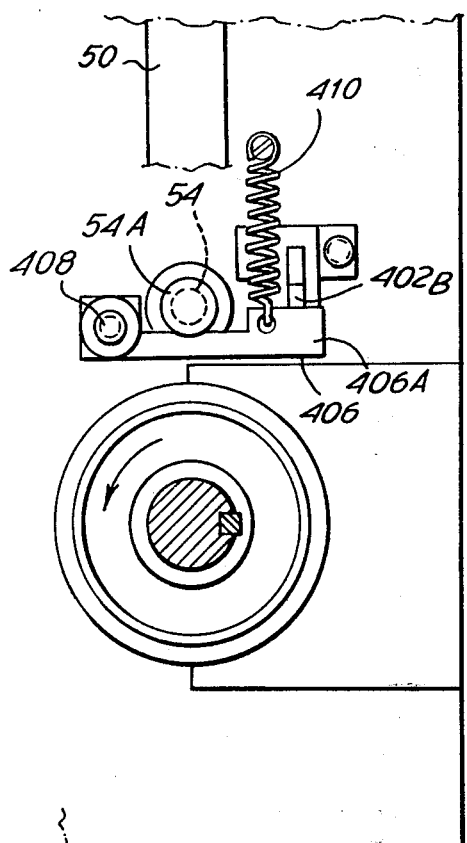
Figure 13:
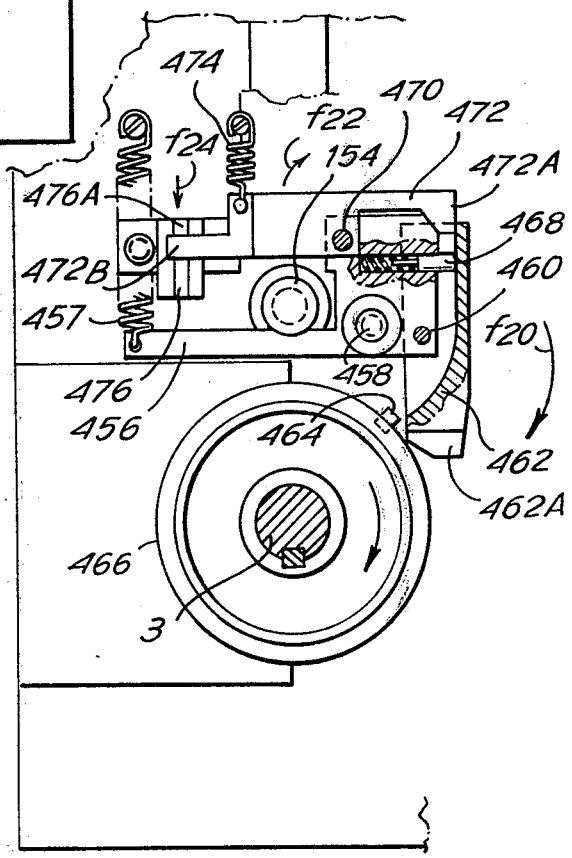
Figure 12:
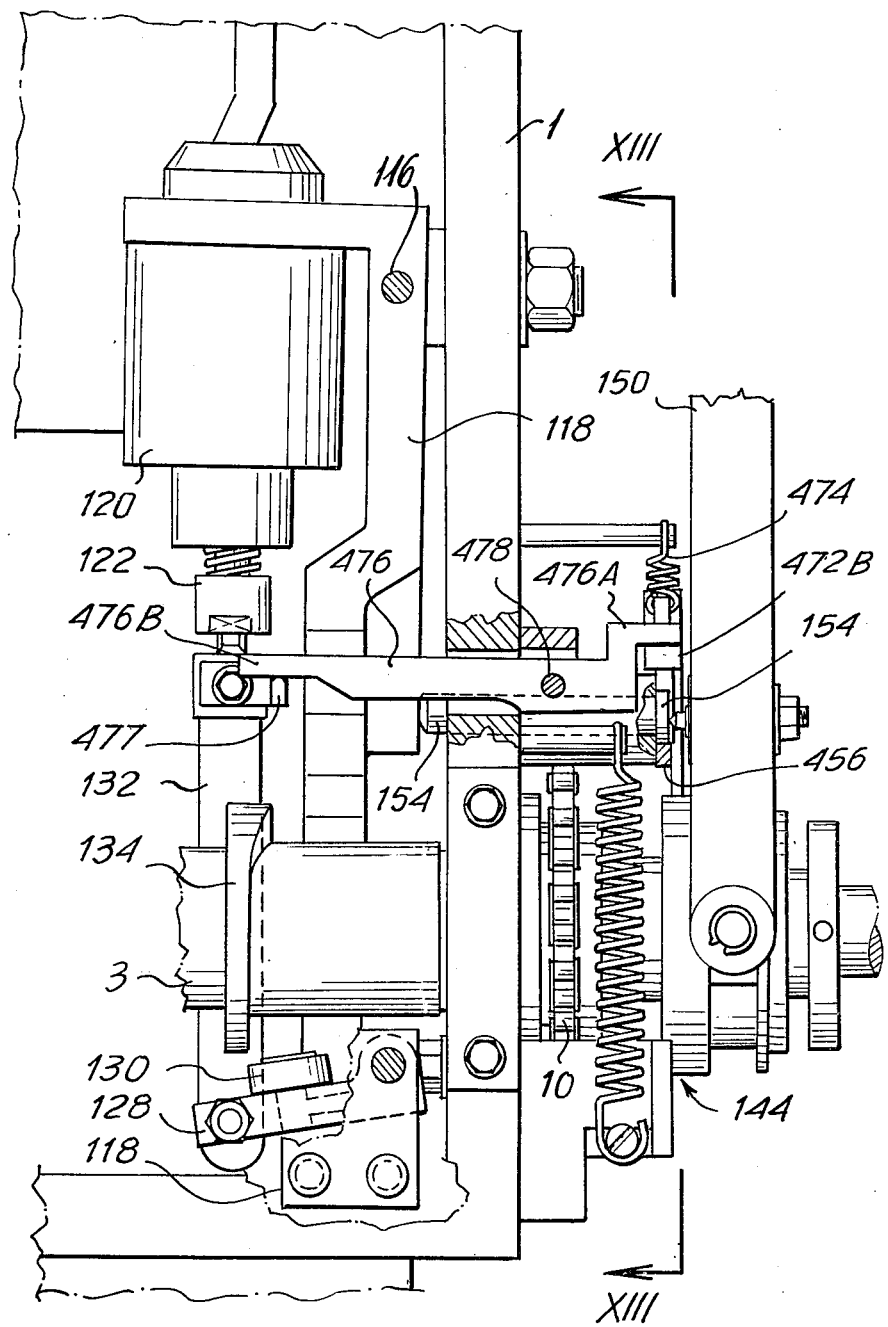
Figure 14:
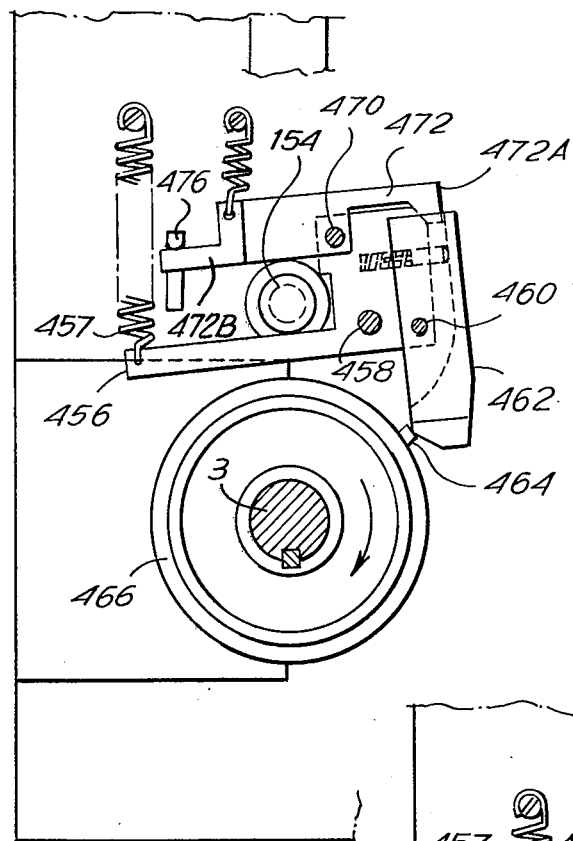
Figure 15:
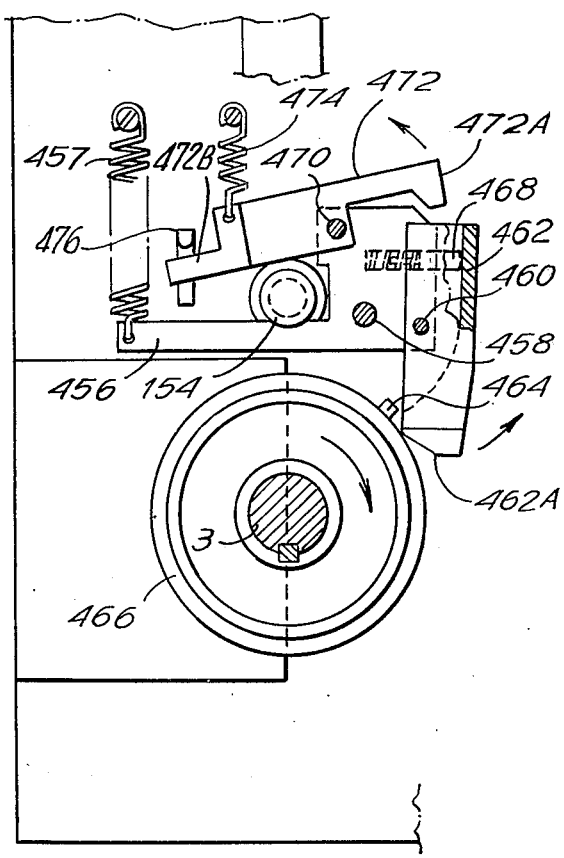

FIGS. 10 and 11 respectively illustrate an axial section, and a cross-section along line XI—XI of FIG. 10, showing a modification with a control mechanical device; and FIGS. 12 and 15 show another control device, in an axial section, and in cross-sections taken along lines XIII—XIII of FIG. 12 for three different relations of the parts involved.

Figure 1:
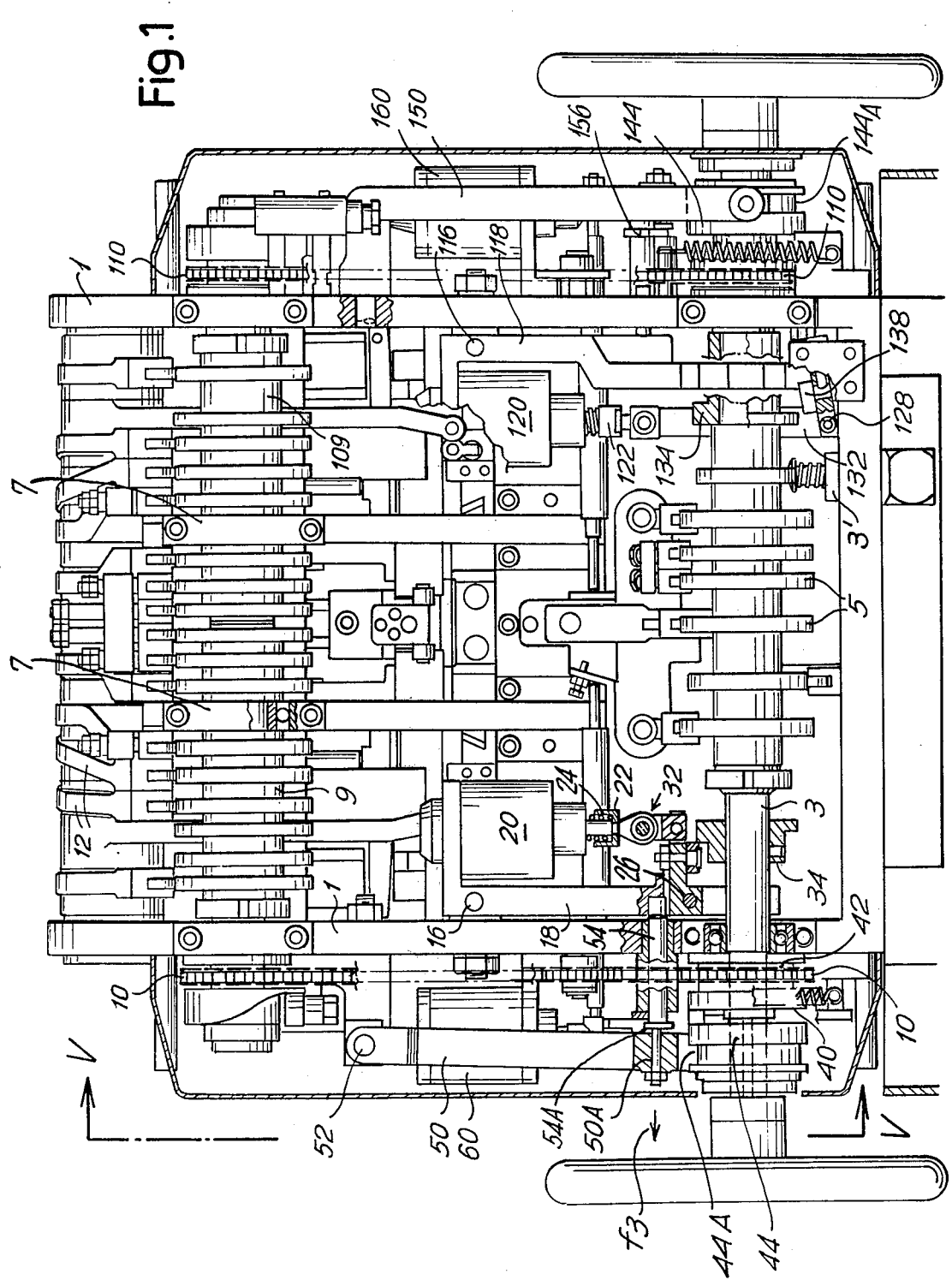
FIG. 1 shows a partly sectioned front view in elevation of the machine.

As shown in the drawing, the machine includes two assemblies, that is, two sections substantially corresponding to the right- and left-hand substantially symmetrical portions, looking at the two aspects of these portions, as seen in FIG. 1. Each section, apart from what will be described in greater detail hereinafter, is structurally formed in a manner known per se in order to carry out certain operations starting from a wire or the equivalent, to form rings, that is, chain links involving successive operations in several stages, which are controlled by means of cams and rocker or transmission means. Some of the most significant and necessary portions of the two sections of the machine will first be described, for a better understanding of the subsequent detailed description of the portions embodying the invention.

1 indicates two flanks or sides of the machine general frame, between which is assembled a continuously rotating cam shaft 3, provided with a plurality of cams, all generically indicated by 5 and which serve by means of rocker arms and the like to constitute controls designed to be repeated in accordance with currently selected and operative feed instantaneously acting therewith for the formation of the chain links. In the upper portion of the machine between the flanks 1 and intermediate supports 7 are mounted two independent and coaxial cam shafts 9 and 109 which are driven in the hereinafter stated manner by means of the respective sprocket chains 10 and 110, the control being alternative according to whether one or the other of the two sections of the machine is to be instantaneously operated. On the cam shafts 9 and 109 cams are assembled which by acting on rockers 12 pivoted on a common axis 14 (FIG. 6), serve to operate certain controls relative to the corresponding and independent feeds for the formation of the link with any of the supplied materials. The operation of one of the cam shafts 9 or 109 involves the stoppage of the other cam shaft 109 or 9, and the stoppage and the operation of these shafts must be established in a perfect synchronism with respect to the other members of the machine, and in particular to the cam shaft 3. The control of these cam shafts 9 and 109 by means of the chains 10 and 110 is dependent on an easily interchangeable and modifiable program to produce certain patterns of different links, the program involving use of the previously mentioned electrical pulses.

In order to obtain the operation and the selective stoppage of the two cam shafts 9 and 109, each of these camshafts depends upon a solenoid-type control connected to a pulse-counter or the like, as well as upon an operative control exactly timed with the shaft 3.

In the machine structure there is linked at 16 for the left-hand section a square lever 18, which may be moved in a plane parallel to or coincident with a plane passing through the axes of the shafts 3 and 9, 9 and 109. On the square lever 18 is mounted a solenoid body 20, with a keeper and a stem 22, which is downwardly urged by a spring 24 and which is raised upon excitation of solenoid 20. At its lower end, the lever 18 is linked at 26 to a lever element 28, carrying a tappet roller 30 having an axis substantially orthogonal to that of the shaft 3, said tappet with said lever 28 being movable about the link pin 26, upon excitation of solenoid 20, and upon counter action of spring 24, the stem 22 being connected via an articulation link 32 to said lever 28. For coaction with the tappet 30, the cam shaft 3 carries an axial profile cam 34, which is adapted to bodily move the tappet 30, the lever 28 and the square lever 18, towards the flank or side frame and against spring action to be described, whenever solenoid 20 is de-energized, and thus when spring 24 has downwardly moved the lever 28 (and thus the tappet 30) to position tappet 30 in operative relation to the cam 34. This enables solenoid 20 to determine operative exposure of tappet 30 to the action by the cam 34, at a synchronized time related to the axial profile of the cam 34 in relation to the tappet 30; once this relation has been set, the movement of the tappet 30, and consequently of the whole unit that is bodily movable by the lever 18, is carried out by the cam 34 in perfect synchronism with the other cams 5 of the cam shaft 3. On the left-hand side, looking at FIG. 1, the tappet 30 is arranged above the shaft 3 and is subjected — as already stated — to the action of a spring 24 which in the absence of solenoid actuation moves the tappet 30 into the position arranged for operation by the cam 34.

On the right-hand side, looking again at FIG. 1, the arrangement for the control of the sprocket chain 110 and of the shaft 109 is reversed, in that a lever 118 equivalent to that 18 and pinned at 116 to the machine frame and carrying the magnet 120, is connected to a small lever 128 in the region beneath cam shaft 3, and thus the tappet 130 is arranged beneath a front cam 134, corresponding to that described at 34 of the opposite arrangement (left-hand side). The keeper 122 of the solenoid 120 in this case returns — by raising — a small lever 128 through a tie rod 132 and therewith the tappet 130 to the positional relationship for actuation by the cam 134. The arrangement on the right-hand side is otherwise equivalent to that described previously in connection with cam 34.

With further reference to the described coaction with cam 34, on the outside of the side frame 1 and on the shaft 3, an idle unit 40 is mounted — by means of a sleeve 36 and roller bearings 38 — which forms the driven member of a dog clutch, to which driven member the wheel for a sprocket chain 42 is connected, for driving the sprocket chain 10 for control of the cam shaft 9 in the corresponding section. On the sleeve 36, which is rotationally and axially locked on the shaft 3, the drive member 44 of the above mentioned dog clutch 40, 44 is slidably mounted, and keyed for rotation therewith, said member 44 being stressed into engagement by springs 46 which re-act on the sleeve 35 and thus on the shaft 3, to urge the drive member 44 towards the nearby side frame. A resilient-action tooth 48 is mounted on the drive member 44 to cooperate with the teeth of the driven member 40, with the aim of assuring the centering and the most suitable position to arrange the clutch for coupling. The drive member 44 is provided with an annular groove 44A which is engaged by roller means at the forked end of a lever 50 pivotally connected at 52 to the stationary frame and adapted to determine a disengagement of the dog coupling 40, 44 against the restorative action of springs 46 when said lever 50 is moved in the left-ward direction, indicated in FIG. 3 by an arrow f3; this is occasioned by the thrust provided by tappet 30, when the latter is operated by the cam 34 in the direction corresponding to that of the arrow f3, all as already described in connection with solenoid 20 and a lever 18. In order to obtain this thrusting drive, a small rod 54 is slidable in a suitably formed seat or guide in the side frame 1, one end of rod 54 being poised adjacent the lever 18 and the other end abutting an adjusting screw 50A on the lever 50. The arrangement is such that the same springs 46, which urge engagement of the dog clutch 40, 44, act by means of the adjusting screw 50A on the column 54 and thus on the unit 18, 20 of the solenoid structure to urge it about the axis 16, with the tappet 30 riding the cam 34, while cam 34 can determine the movement of rod 54 in the direction of arrow f3 to cause a dog-clutch disengaging displacement, against the action of springs 46. Rod 54 is shown with an outer flanged head, engageable by a guillotine-like locking member 56, which is pivotally mounted at 58 and is operated by a second solenoid 60 located on the outside of the side frame 1 (see also FIG. 5). Upon timely lowering of this member 56, the thrust rod 54 is retained in the position it reaches through action of the lever 18, until solenoid 60 is subjected to electric control. Thus, through control action via solenoid 60, one determines first a retention of clutch 40, 44 in the disengagement position, wherein thrust rod 54 is locked in its left position (in the case of FIG. 3) irrespective of cyclic thrust action of cam 34 in the direction of the arrow f3, and second, the indicated action allowing rod 54 to return in the reversed direction, as determined by the cam 34.

The solenoid 20 will be seen to determine the relationship for dog-clutch disengagement while the cam 34 establishes the exact timing for disengagement; and solenoid 60 imposes the duration of disengagement and thus the duration of the stoppage of the drive operated by the sprocket chain 10 and thereby of the cams 9 and of the whole pertinent section of the machine. A possibly reversed arrangement is obtained with the cam 134 and the tappet 130, which acts through the column 154 on the lever 150 corresponding to that at 50, while a solenoid 160 operates a guillotine member 156 equivalent to that at 56. 144 indicates the drive member for the pertinent clutch, provided with a groove 144A for operation by the lever 150.

Figure 2:
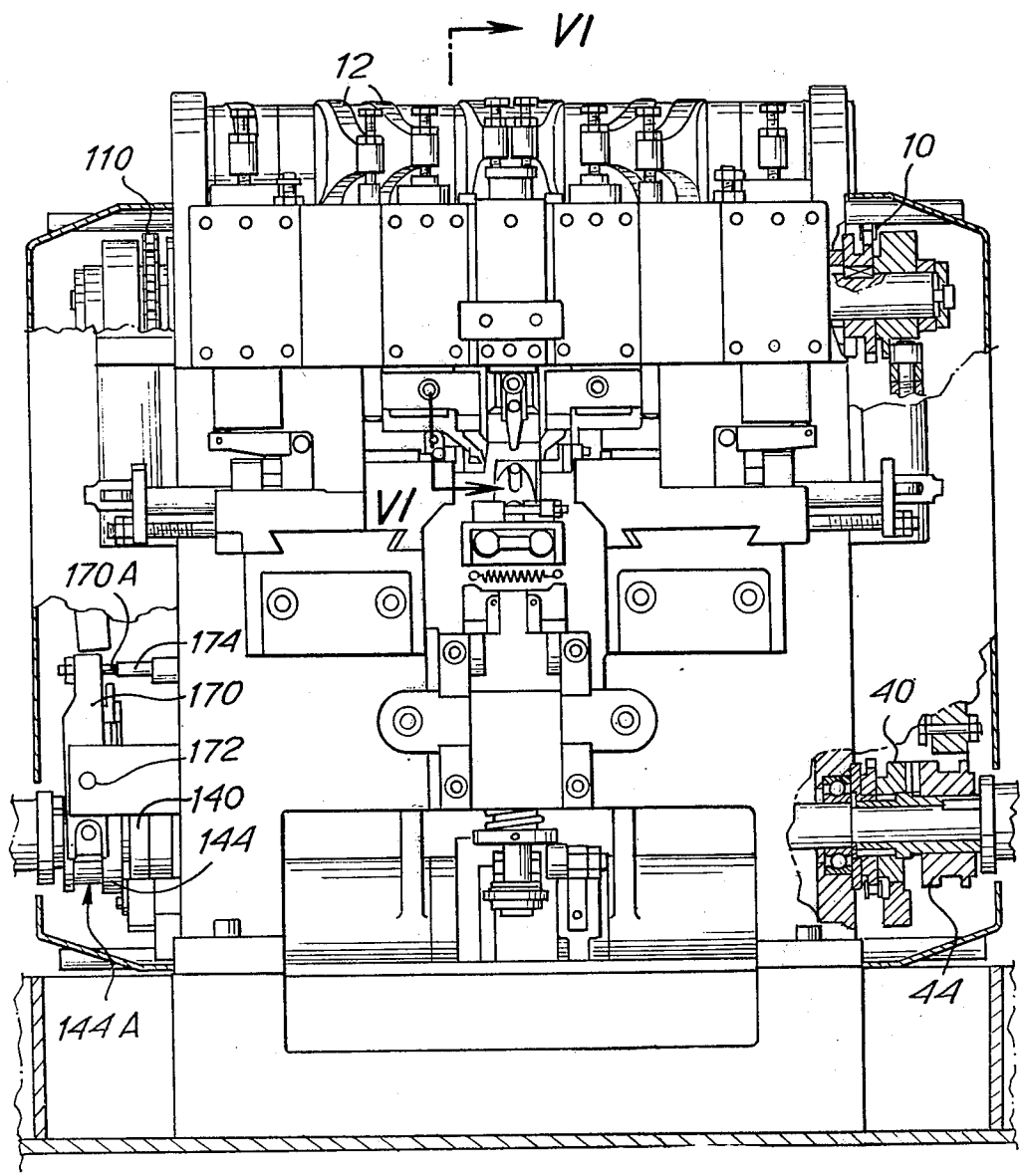
FIG. 2 shows a rear view in elevation of the machine of FIG. 1.

According to what is particularly shown on the left-hand side of FIG. 2, the groove 144A of the drive member 144 of the above mentioned clutch is also engaged by an operating slipper or roller carried at the end of a forked lever 170 pivotally connected at 172 to a support bracket of the frame, the lever 170 being in the form of a rocker arm with an adjusting tappet 170A, positioned to act on a stem 174 slidable in the frame to determine a movement in a direction against the action of opposing spring means, so as to determine a positioning by means of the stem 174, in synchronism with the engagement and disengagement of the associated dog clutch 140, 144; this control serves to program the transverse movement of a "plate-carrier head" to allow it to make two types of links. A similar arrangement is provided for the previously described clutch 44. Other operative systems — all subordinated to the movement of engagement and disengagement of the drive member 44 or 144, as the case may be — are provided to operate on the active members of the machine which must be operated and deactivated according to the preselected program to obtain the modifications of form and/or structure of the developing links, and with the accompanying change in the respective feeds for the different-sized links to obtain according to the program a chain product having a particular differentiated-link pattern imposed by the selected electrical-pulse or the like program. An arrangement similar to that above described is provided to determine operation of the member 44.

Substantially, for each section alternatively operative in the machine (the sections provided in the illustrated machine being two, but provision being possible for a higher number thereof), a continuous operation is provided for the members which are common to the two sections and which are operated by the cams 5 of the cam shaft 3, while alternative operations are provided for the members pertinent to each of the two sections, via the respective cam shafts 9 and 109, which are alternatively operated, and by the additional controls subordinated to the above-indicated clutch-control movements. It is to be noted that engagement or disengagement are perfectly controlled at the start and at the end of the disengagement period, respectively, as it is always the cam 34 or 134 which determines the movements of the unit of the drive member 44 in the engagement and disengagement stroke; since the two cams 34 and 134 are mounted in perfectly timed relation with each other on the shaft 3, a perfect timing of the coordinated movements is ensured, both in relation to common members of the two sections and in relation to the single sections which are operated in alternation.

Figure 7:
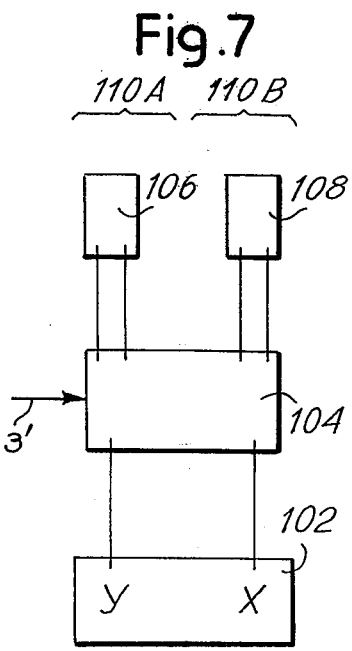

FIG. 7 schematically illustrates an operative circuit relating to a two-feed arrangement. In this arrangement, 102 represents a programmer, 104 a microcontact unit, and 106 and 108 two solenoids. The machine is divided into two sections 110A and 110B. When the portion 110A is to be operated, the programmer 102 will mark in this case a "Y" value to be transmitted by means of the microcontact 104 to the solenoid 106, and will cause the portion of the machine controlled by said circuit to rotate as many times as the value of "Y" to produce as many chain elements. When this preselected "Y" value has been reached, the contact 104 will be released, thereby opening the circuit of the portion 110A and closing the circuit of the portion 110B; in similar fashion, different link elements to the extent of a preselected X number will be made in alternation with the Y-sequence, said X number being equal to or different from Y, but the shape or the type being different. The program tape operative at 102 will be understood to be programmable for a chain pattern which may be repeated from one time to infinity, with infinite combinations; in practice, for example, with a programming tape one may obtain programs such as: $1 + 2$; $1 + 4$; $1 + 6$; $1 + 1$; $2 + 1$, all in a single chain. Such patterns can also be obtained with a programmed circuit using pulse-counters, and in particular using six pulse-counters for a program as above mentioned. With reference to FIG. 7, for instance, one may consider that in the portion 110A of the tape there is the element "Y" corresponding to 1, and in the portion 110B there is the element "X" corresponding to 2, 4, 6, 4 and 2; when operating the machine, the portion 110A thereof will be moved thereby producing the first chain element, that is, the circuit and the circuits controlled by the solenoid 106 will be closed, while the portion 110B of the machine will remain stationary. At this point, the microcontact 104 switches the circuit of 110A off to close the circuit of portion 110B; in this case, "X," which may have, for instance, a value 2, will give two pulses to the solenoid 108 by means of the contact 104, thereby imparting two chain-link producing cycles of the machine, which will correspond to producing two link elements of the chain. The microcontact 104 will then again close the contact of portion 110A to form another element "Y," whereupon clutch action will be operative in the portion 110B to form four elements "X." Thus, the link-forming cycles and movements will be alternative, coming to closure in one time phase to operate the circuit of portion 110A and in the other time phase to operate the circuit of portion 110B, producing 6 links more, then 4 and finally 2 in the portion 110B, while in interlaced operation of portion 110A the variously numbered elements "X" are interconnected by an element "Y," produced at the alternative intervals.

Figure 8:
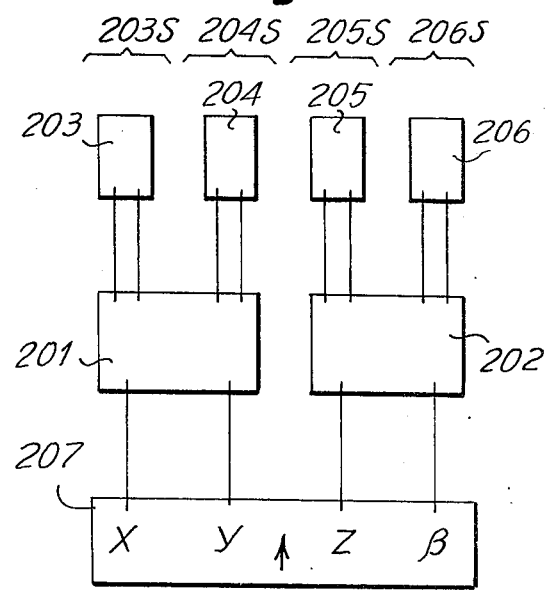

FIG. 8 illustrates a four-feed electrical diagram, wherein 201 and 202 are two microcontact units, wherein 203, 204, 205, 206 are as many solenoids relating to the sections 203S, 204S, 205S, 206S, and wherein 207 is the programmer. In order to explain the operation, it is preferable to divide the machine and the electromagnetic circuit into the aforesaid sections or portions. In this case, by inserting a programming tape which controls the microcontacts and the solenoids with a preset program "X, Y, Z, J," and by operating the machine, a chain with four types of different elements will be obtained with combinations which may be infinite. The portion 203S of the circuit will be closed, when the microcontact 201 which receives the pulse "X" from the inserted programming tape; in this way, said pulse will be transmitted to the solenoid 203 and the latter will cause the potion 203S, which is controlled by the circuit of said solenoid, to rotate as many times as the value of X. Once this value has been reached, the microcontact 201 opens the circuit of the portion 203S, instantaneously closing the circuit of the portion 204S which will operate another portion of the machine; this portion will remain operative so as to produce a number of elements "Y" different from or equal to "X" but having a different form. Upon termination of the pulse "Y" of the program, the portion 204S ceases to operate, while the pulse due to the value "Z," which will activate the microcontact 202 to operate the solenoid 205 and thus the portion 205S of the machine, will begin; once said value has been reached, the microcontact 202 will open the contact of the circuit of the portion 205S closing the circuit of the portion 206S by operating the solenoid 206; this portion 206S will rotate as many times as the value of "J." Then, the cycle will be repeated, either with the same program, or with different programs.

The machine may have even more than four feeds, depending upon the types of elements which are required in a chain.

Figure 9:
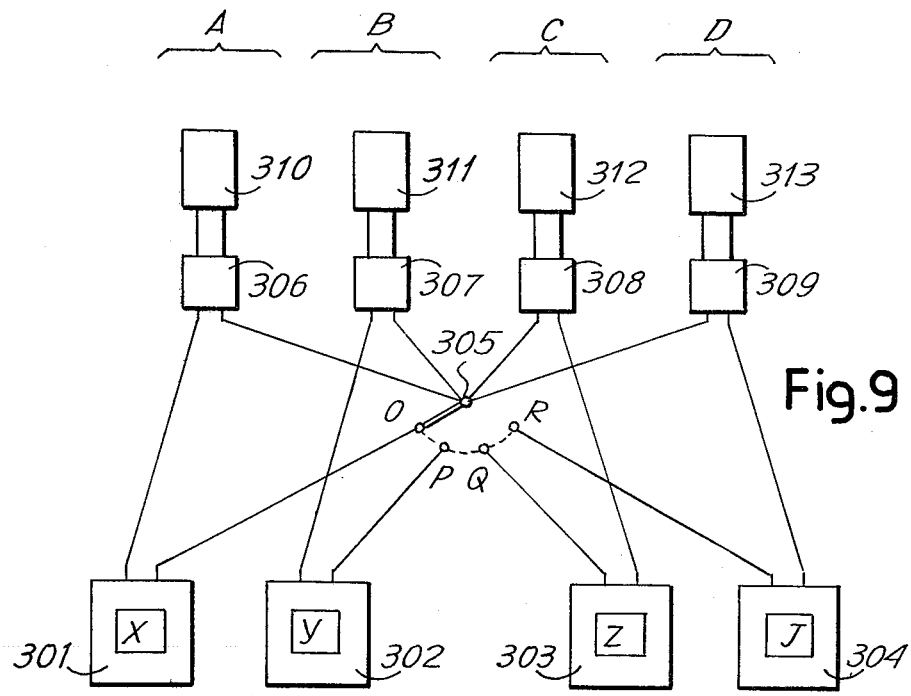
FIGS. 7, 8 and 9 illustrate three operative diagrams.

FIG. 9 represents a circuit of a four-feed machine, the feeds being programmed according to four pulse-counters 301, 302, 303 and 304, where the preset values of the program "X, Y, Z, J" will be read out; 305 is a stepping relay, 306, 307, 308 and 309 denote microcontacts, and 310, 311, 312 and 313 are as many and corresponding solenoids. Here again, it is preferable to divide the machine and the circuit into a portion A, a portion B, a portion C and a portion D, and it will be assumed that the machine is activated when the relay 305 is in the position O, thus closing the circuit of the portion A. The pulse-counter 301 will transmit the value "X" to the microcontact counter 306, which will operate the magnet 310, and thus the portion A of the machine will be operated to effect as many revolutions as are established by the value "X," thereby producing "X" elements of a certain type. The relay 305 will be stepped into the P position closing the circuit of portion B, and activating by means of solenoid 311 another portion of the machine. Once the value "Y" has been reached, the relay 305 will be stepped into the Q position closing the circuit of portion C and activating thereby another portion of the machine, and this portion will remain operative until the number of "Z" elements has been reached, the said number of elements being different from or equal to "Y" or "Z," but different in shape upon termination of the pulse due to the pulse-counter, the relay 305 is further stepped into the R position to close the circuit of the portion D; and while in this position solenoid 313, by means of the received pulse, will rotate the fourth link-forming portion D of the machine as many times as the value "J" at which point, the relay 305 will be stepped to return to the position O, to resume the cycle.

According to the modification of FIGS. 10 and 11, wherein the members corresponding to those of the previous example are indicated with the same reference numerals, the unit 28, 32, 22 which is controlled by solenoid 20 coacts with an end 402A of a small lever 402 pivotally pinned at 404 to the stationary frame 1. The end 402B, opposite the end 402A of lever 402, acts from the top to the bottom on the movable end 406A of a lever 406 which is pivotally pinned at 408 to the stationary frame; the lever 405 is shaped to be engaged below the flanged head 54A of the rod 54 which is designed to act on the lever 18 the latter being pivotally mounted at 16 and carrying the solenoid 20. A tension spring 410 urges lever 406 in the direction to seat below the flanged head 54A.

Figure 3:
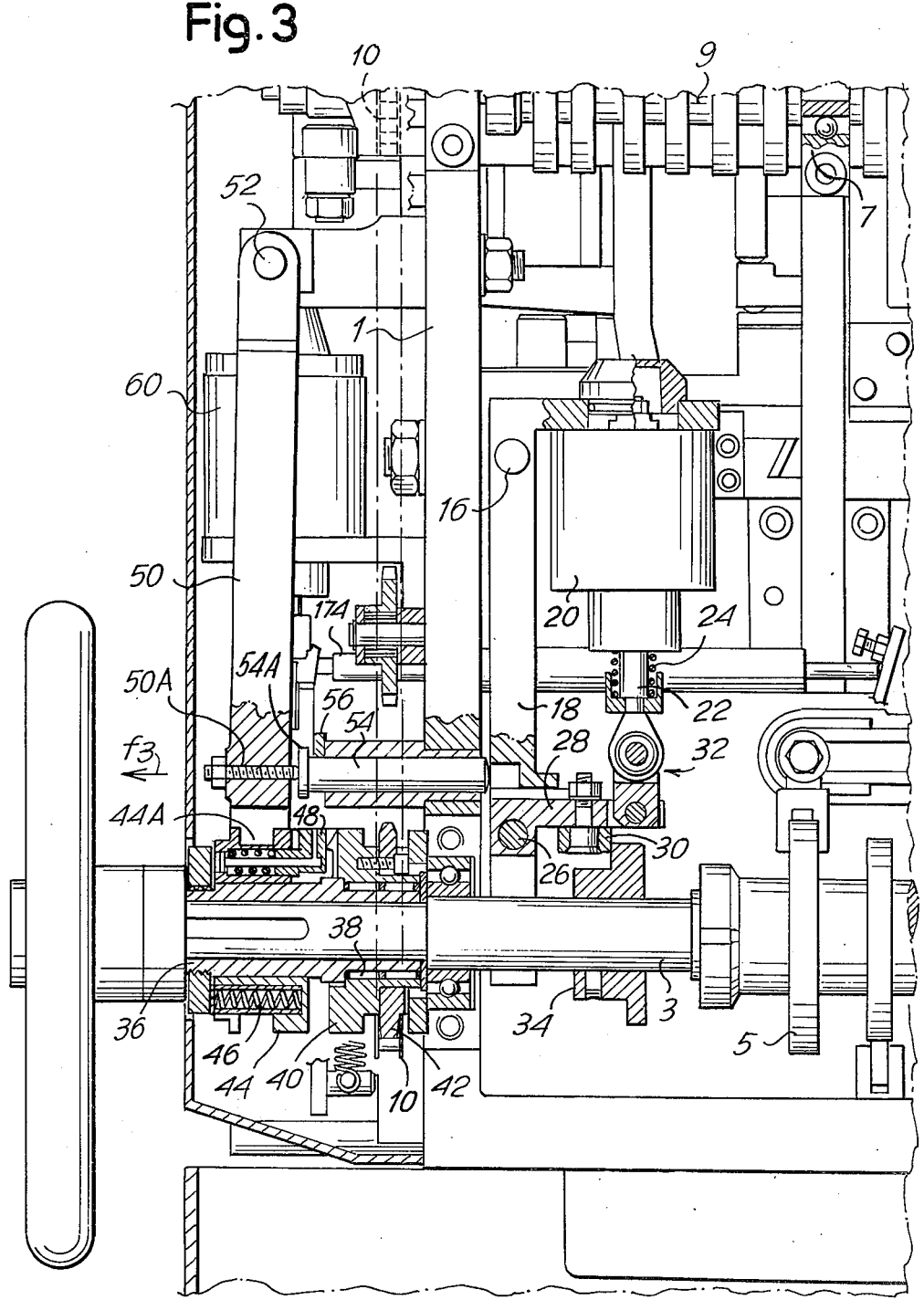
FIGS. 3 and 4 illustrate two enlarged details of FIG. 1.
Figure 4:
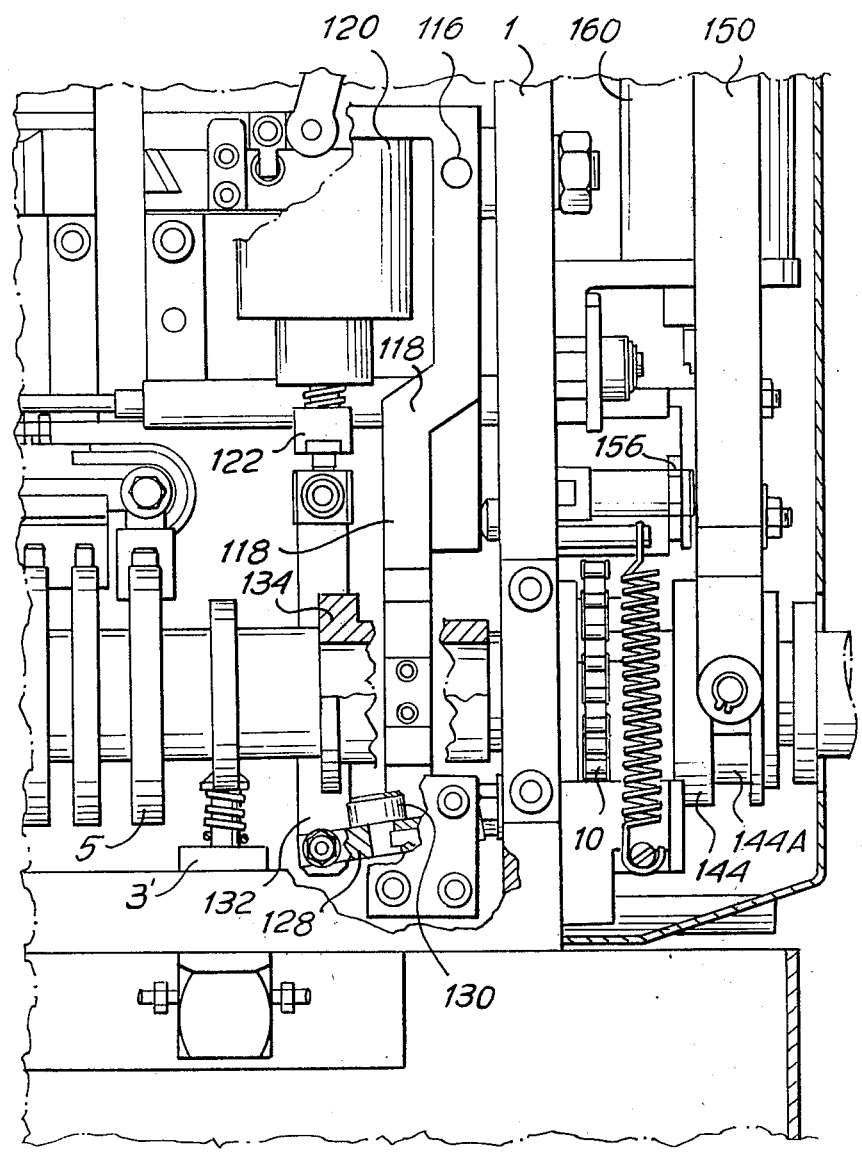

Under the conditions shown in the drawing, which correspond to the conditions referred to in FIG. 3 of the first-described embodiment, the tappet 50A of the arm 50 acts on the flanged head 54A of the thrust rod 54, which however is prevented from being moved towards the square lever 18 by the presence of the lever 406, whose function is similar to that of the lever 56 of the previous example; in this example, both lever 56, and the associated solenoid 60 are omitted, as the lever 402 and 402B accomplishes the function previously belonging to the solenoid 60. When solenoid 20 returns raises the unit 22, 32, 28, lever 402 is moved in such a manner that the end 402B is lowered, thereby downwardly moving lever 406 against the action of spring 410. It is thus possible to release the flanged head 54A and to allow the movement of the thrust rod 54 for the same function which in the previous example was subordinated to control by the solenoid 60.

The suppression of the solenoid 60 avoids troubles in the event of power failure which simultaneously de-energizes the two solenoids 20 and 60.

According to the modification of FIGS. 12 to 15, an alternative control is provided with respect to that operated by the solenoid 160 of the previous example. Also, in this modified embodiment the drawbacks sometimes appearing in the operation of the machine are avoided — with their consequent possible damages — in case of power failure and simultaneous de-energization of the two solenoids 120 and 160.

According to the FIG. 12 modification, the thrust rod 154 is controlled by a guillotine-like locking member 456 equivalent to that 156 of the previous example (but lower rather than upper), which is pivotally connected at 458 to the stationary structure and is urged against rod 54 by a spring 457. A shaped pawl 462 with its own lower end 462A is pivotally mounted at 460 to the member 456 to cooperate with a pin 464 carried by a disc 466 rotating with the drive shaft 3. The pawl 462 is urged by a spring-loaded pin 468, to pivot about pin 460 in the direction indicated by the arrow f20, i.e. towards the periphery of the disc 466. On the member 456 a locking member 472 is additionally connected via a pin 470, said member being provided with a tooth 472A and an extension 472B; a spring 474 stresses the member 472 in the direction of the arrow f22, while in the reversed direction, the end 472B may be urged in the direction of the arrow f24 by the end 476A of a lever 476 linked in 478 to the stationary structure. The lever 476 with its own end 476B opposite the end 476A is affected — through a pin 477 — by the electromagnet 120 and the lever 128 carrying the feeler 130 cooperating with the cam 134.

Until the solenoid 120 is energized (to and thus upwardly returns the end 476B of the lever 476), the end 476A of this lever retains the member 472 against the action of the spring 474 with the end 472A raised (see FIG. 15) and thus disengaged from the upper end of the pawl 462; said pawl is thus free to rock around the pin 460 in the direction opposite to the arrow f20, when the pin 464 reaches and exceeds the end 462A of the pawl 462. In this circumstance, the guillotine-like member 456 remains in the position whereinto it is moved by the spring 457, to retain the head of the column 154 and prevent the column from accomplishing its action on the member 118 supporting the solenoid 120, thereby preventing the clutch 144 from engaging. When lever 476 is lowered for the de-energization of solenoid 120, the end 476A is raised in a direction opposite to the arrow f24, and thereby the spring 474 determines a rotation of the lever 472 in the direction of the arrow f22; the toothed extension 472A is then depressed to interfere with the pawl 462 which is prevented from moving in the direction opposite to the arrow f20 when the pin 464 acts on said pawl. Under these conditions, the action of the pin 464 is carried out on a rigid assembly which is formed by the members 462 and 456 locked to each other by the extension 472A which has been depressed in the aforesaid manner; consequently, the pin 464 determines the movement of the unit 462, 456 around the pin 458 substantially in a direction reversed to the arrow f20, which in turn determines the separation of the guillotine-like member 456 from the head of the column 154, and thus releases this column to let it carry out its action and allow the matching of the clutch 144.

We claim:

1. In a machine for manufacturing chains, a frame, a main camshaft and means for continuously rotating the same, first and second alternatively operable camshafts journaled for independent rotation in said frame, first chain-link forming mechanism operated by one of said alternatively operable camshafts, second chain-link forming mechanism operated by the other of said alternatively operable camshafts, further chain-link forming mechanism serving both said first and second forming mechanisms and operated by said main camshaft, each of said forming mechanisms having one link-forming cycle per revolution of said main camshaft, first and second electrically operated means associated with the respective alternatively operable camshafts for connecting a selected one to the exclusion of the other of said alternatively operable camshafts to said main camshaft, and program means connected to said electrically operative means and operative to determine a predetermined number of cycles of one of said alternatively operable camshafts in alternation with a predetermined number of cycles of the other of said alternatively operable camshafts, whereby in the circumstance of said first and second chain-link forming mechanisms being respectively set up to form chain links of different character, said program means will establish a predetermined pattern of successively formed chain links of different character.

2. A chain-manufacturing machine according to claim 1, in which said electrically operated means includes clutch means for determining the engaged versus disengaged relation of said alternatively operable camshafts with respect to said main camshaft.

3. A chain-manufacturing machine according to claim 2, in which a cam on said main camshaft is operative to determine the instant of clutch engageability as a function of each revolution of said main camshaft, said electrically operated means including cam-follower means establishing a selectively operable connection from said cam to said clutch depending upon excitation of said electrically operated means.

4. A chain-manufacturing machine according to claim 2, in which a cam on said main camshaft is operative to determine the instant of clutch disengageability as a function of each revolution of said main camshaft, said electrically operated means including cam-follower means establishing a selectively operable connection from said cam to said clutch depending upon excitation of said electrically operated means.

5. A chain-manufacturing machine according to claim 2, in which said clutch means comprises a separate clutch for establishing the engaged versus disengaged relation of each of the respective alternatively operable camshafts to said main camshaft.

6. A chain-manufacturing machine according to claim 5, in which the operative connection from said main camshaft to each of said clutches includes a mechanical disabling element, and in which said electrically operated means is operatively connected to said disabling element.

7. A chain-manufacturing machine according to claim 6, in which said electrically operated means is provided in duplicate, each said electrically operated means being operatively connected to the disabling element associated with a different one of said clutches.

8. A chain-manufacturing machine according to claim 7, in which said disabling elements are solenoid-operated, the disabling element associated with one of said clutches being in clutch-disabling condition for the solenoid-excited condition, while the disabling element associated with the other of said clutches is mechanically displaced out of clutch-disabling condition for the solenoid-excited condition; and in which the disabling element associated with said other of said clutches is in clutch-disabling condition for the solenoid-unexcited condition, while the disabling element associated with said one of said clutches is mechanically displaced out of clutch-disabling condition for the solenoid-unexcited condition.

* * * * *